Dec. 15, 1931.   C. W. VAN RANST   1,836,095
UNIVERSAL JOINT
Filed May 16, 1928   2 Sheets-Sheet 2
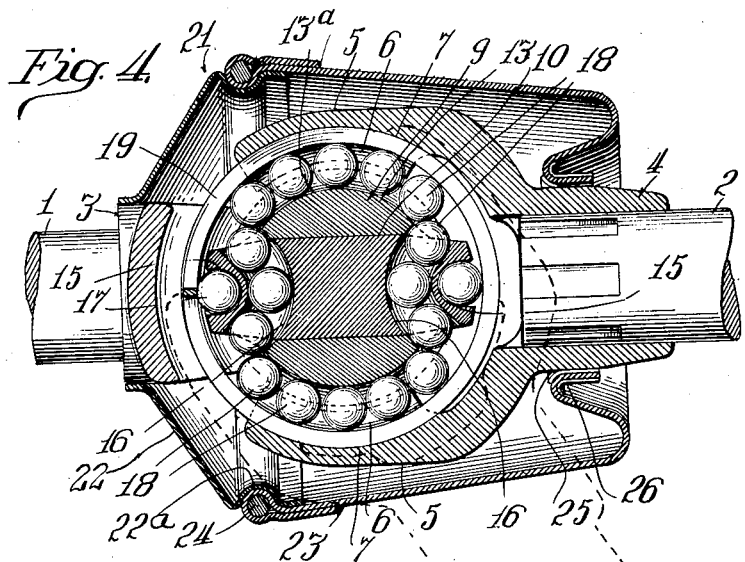
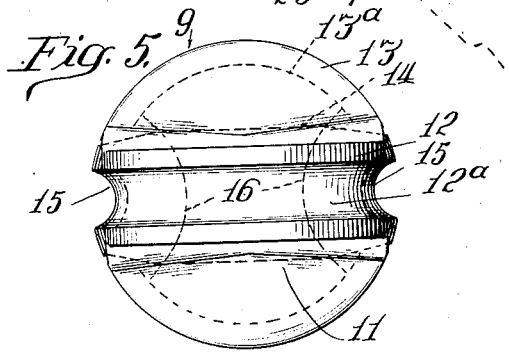
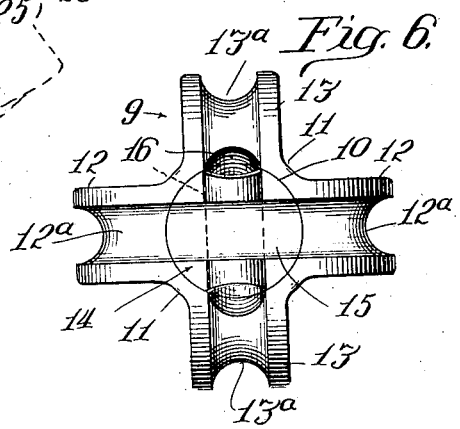
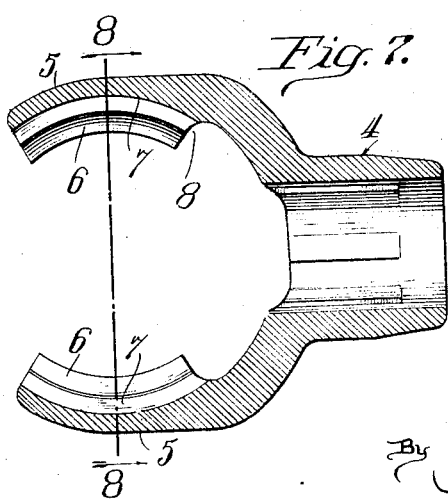
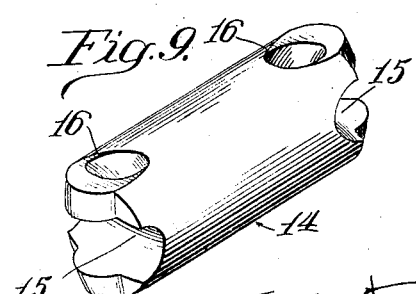
Inventor
CORNELIUS W. VAN RANST
By Arthur W. Nelson
Attorney Patented Dec. 15, 1931

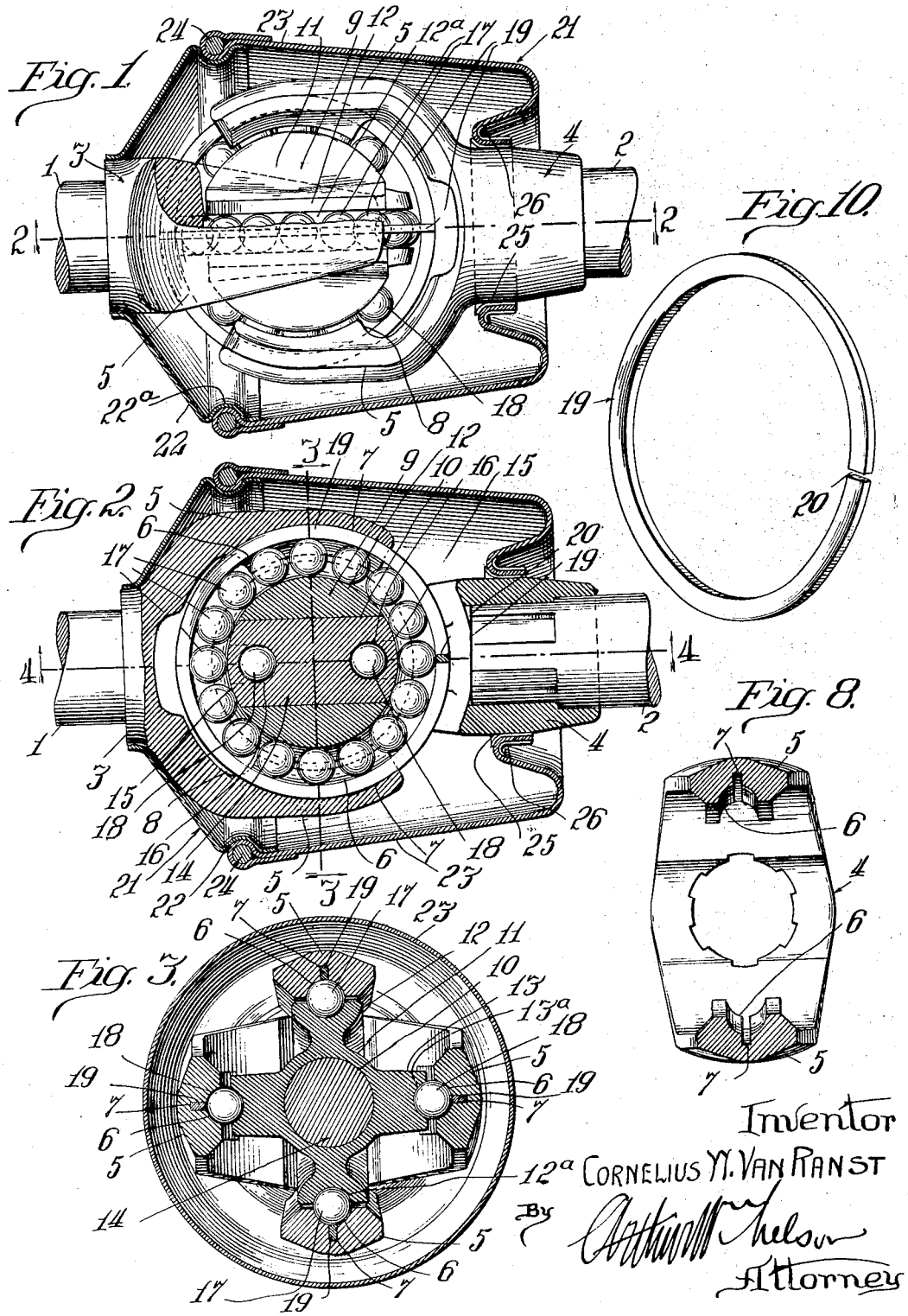

1,836,095

UNITED STATES PATENT OFFICE

CORNELIUS W. VAN RANST, OF INDIANAPOLIS, INDIANA, ASSIGNOR, BY MESNE ASSIGNMENTS, TO MANNING & CO., OF CHICAGO, ILLINOIS, A CORPORATION OF ILLINOIS

UNIVERSAL JOINT

Application filed May 16, 1928. Serial No. 278,070.

This invention relates to improvements in universal joints and it consists of the matter hereinafter described and more particularly pointed out in the appended claims.

The primary object of the invention is to provide an improved construction in a joint of this kind, which permits of a greater relative angular position between the shaft parts with which it is associated and one which provides a full and complete anti-friction bearing between the parts thereof to reduce wear and driving resistance to a minimum.

Another object of the invention is to provide a joint of this kind wherein two complete annular sets of balls are arranged between the shaft end yokes and central connecting member and which sets of balls though located in meridianal raceways of the same substantial diameter, are disposed the one at a right angle to the other, with the balls of one set freely passing those of the other set where they intersect or cross each other.

These objects of the invention, as well as others together with the many advantages thereof will more fully appear as I proceed with my specification.

In the drawings:—

Fig. 1 is a view in side elevation of my improved universal joint with parts thereof broken away to more clearly disclose the construction thereof and with the enclosing housing shown in longitudinal section.

Fig. 2 is a longitudinal sectional view through the improved joint as taken on the line 2—2 of Fig. 1.

Fig. 3 is a transverse vertical sectional view through the joint as taken on the line 3—3 of Fig. 2.

Fig. 4 is another longitudinal sectional view through the improved joint as taken on the line 4—4 of Fig. 2.

Fig. 5 is a view in side elevation of the central connecting member of the joint.

Fig. 6 is a view in end elevation of the member shown in Fig. 5.

Fig. 7 is a longitudinal section through one of the yokes or forks embodied in my improved joint.

Fig. 8 is a transverse vertical sectional view through the yoke or fork shown in Fig. 7 as taken on the line 8—8 of Fig. 7.

Fig. 9 is a perspective view of a filler plug associated with the central connecting member of the joint shown in Figs. 5 and 6.

Fig. 10 is a perspective view of one of a pair of ball retaining members employed in my improved joint.

In general my improved universal joint comprises a pair of forks or yokes each fixed at one end to an associated shaft and each including a pair of substantially arcuate arms, with the arms of one yoke disposed in a plane at a right angle to the arms of the other yoke, the inner surfaces or portions of said arms having grooves which form a part of an annular ball raceway. Associated with the said arms is a central connecting body or member having a pair of meridianal raceway grooves arranged the one at a right angle to the other to coact with the raceway grooves of the arms to receive two circular rows of balls secured against displacement by suitable retainers. Said rows of balls are of the same diameter and the connecting body or member is so formed as to permit the balls of one row to pass those of the other row without interference.

Referring now in detail to that embodiment of the invention illustrated in the accompanying drawings 1 and 2 indicate respectively, two adjacent shaft ends which it is desired to couple together in a driving relation and 3 and 4 indicate respectively, yokes or forks fixed to said shaft ends, each of which yokes includes a pair of substantially arcuate arms 5—5 with the arms of one yoke disposed in a plane at a right angle to those of the other yoke as best shown in Figs. 1 and 3. The inner surface of the outer end of each arm is formed to provide an arcuate groove 6, substantially semi-cylindrical in cross section and also formed in each arm to open into the groove 6 therein, is a narrow flat groove 7, the purpose of which will later appear. The arms of each yoke are of such an arcuate length as to constitute more than a semi-circle while the inner or meeting ends of said arms are cut away as best shown at 8 in Fig. 7 to better expose the parts of the joint to a lubricant with which the joint is packed when in use.

In connection with said yokes, is employed a central body member 9 best shown in Figs. 5 and 6. Said body which approximates a sphere has an axially disposed central bore 10 and parts 11 of the body are cut away to not only reduce the weight thereof but also to provide two pairs of meridianal ribs 12 and 13 respectively with one arranged at a right angle to the other. Each rib is formed with a peripheral groove 12ª—13ª respectively therein and fixed in said bore 10 is a cylindrical plug 14 best shown in Fig. 9. In the extreme ends of said plug are provided transversely extending grooves 15—15 made on the arc of the circle of the grooves 12ª of the body member 9 to form continuations of said grooves and adjacent said extreme ends of the plug are transversely extending openings 16—16 arranged at a right angle to the grooves 15—15 and adapted to register with the grooves 13ª in said body member. Thus when the plug is positioned in the bore of said body member, there is provided two continuous raceways each of the same diameter and with one raceway passing the other as best shown in Fig. 4. In the raceways as defined by the said grooves in the body member and yoke arms are two complete sets of anti-friction balls 17 and 18 respectively and said balls are held against displacement by retaining rings 19—19 which seat in the narrow flat grooves 7—7 of the yoke arms 5—5. Each retainer ring is substantially a full complete annulus, split at one point as at 20 in Fig. 10 and when said rings are in operative position in the joint, one ring passes through the other at said split.

The joint thus far described is enclosed in a housing 21 as best shown in Figs. 1, 2 and 4 respectively and this housing comprises a funnel shaped metallic housing member 22 which is fixed at one end to the body of the yoke 3 and is provided at its larger open end with an annular groove 22ª. Associated with said metallic housing member is a second housing member 23 of leather which carries a bound in ring 24 at one end fitting in the groove 22 of the housing 21 while the other end is reversely folded over and is held in place in a channel ring 25 carried on the body of the yoke member 4 by a snap ring 26. Such a housing not only has that flexibility which permits the angular change between the shaft ends as best shown in dotted lines in Fig. 4, but will retain the lubricant with which the joint is packed, when installed in its position of intended use.

With such a construction wherein the two sets or rows of balls are continuous and of the same diameter, greater angular positions of the shaft ends may be had without interfering with the drive from one shaft end to the other and the velocity of the arms remains constant no matter what the relative angle between the shaft ends happens to be. Again with such a structure, the two full rows of balls provide the driving and driven connection between the forks with the result that the load is better distributed and the parts therefor cannot so readily wear out and get loose. Therefore such a joint is admirably adapted for use in front wheel drive mechanism for automobiles.

While in describing my invention, I have referred in detail to the form and arrangement of the parts thereof, I do not wish to be limited thereto except as may be pointed out in the appended claims.

I claim as my invention:—

1. A universal joint embodying therein yokes each having a pair of substantially arcuate arms, with the arms of one pair disposed in a plane at an angle to those of the other pair, a body member disposed centrally of said arms and two full annular rows of anti-friction members each row being of the same diameter, disposed in the planes of said arms and operatively connecting said arms and body member together, the anti-friction members of one row extending through parts of said body to pass those in the other row.

2. A universal joint embodying therein, yokes each having a pair of substantially arcuate arms, with the arms of one pair disposed in a plane at an angle to those of the other pair, a body member disposed centrally of said arms and two full annular rows of balls disposed in the planes of said arms and operatively connecting them to said body member, both rows of balls being of the same diameter with the balls of one row passing those of the other at the points of intersection thereof.

3. A universal joint embodying therein, yokes each having a pair of substantially arcuate arms, with the arms of one pair disposed in a plane at an angle to those of the other pair, a body member disposed centrally of said arms and two annular rows of balls disposed in the planes of said arms and operatively connecting them to said body member, both rows of balls being of the same diameter and the balls of one row passing through a part of said body as they approach the balls of the other row.

4. A universal joint embodying therein yokes each having a pair of arms with arcuate opposed grooves therein, the arms of one pair being disposed at an angle to those of the other pair, a body member disposed centrally of said arms and having a pair of annular grooves, with one groove thereof coacting with the grooves of one pair of arms to provide an annular raceway, a complete row of balls in each raceway, both rows being of the same diameter and so arranged that the balls of one row pass the balls of the other as they approach each other and a split ring, one associated with and held in position by each pair of arms to retain the associated row of balls, said rings passing through each other at their point of intersection.

5. In a universal joint, a substantially spherical body member having a pair of meridionally disposed ball race grooves of the same diameter, said body member having openings in the plane of one of said grooves where it approaches the other to maintain the continuity of said first mentioned groove.

6. In a universal joint, a substantially spherical body member having an opening therethrough, and formed on its exterior to provide a pair of meridionally disposed ball race grooves and a plug in said opening having transversely disposed grooves in its extremities, disposed in the plane of one of said pairs of grooves and providing a continuation thereof, there being openings in said ends disposed transversely of the grooves in said extremities and registering with and connecting the ends of the other pair of grooves.

7. A universal joint embodying therein yokes each having a pair of substantially arcuate arms, with the arms of one pair disposed in a plane at an angle to those of the other pair, a body member disposed centrally of said arms and two full annular rows of antifriction members, there being a row of said antifriction members disposed in the plane of each pair of said arms and operatively connecting said arms and body member together, the anti-friction members of one row extending through end portions of said body to pass those in the other row.

In testimony whereof, I have hereunto set my hand, this 23 day of March, 1928.

CORNELIUS W. VAN RANST.